J. H. BRAMKAMP.
ROUNDABOUT.
APPLICATION FILED MAR. 6, 1909.
953,119.
Patented Mar. 29, 1910.
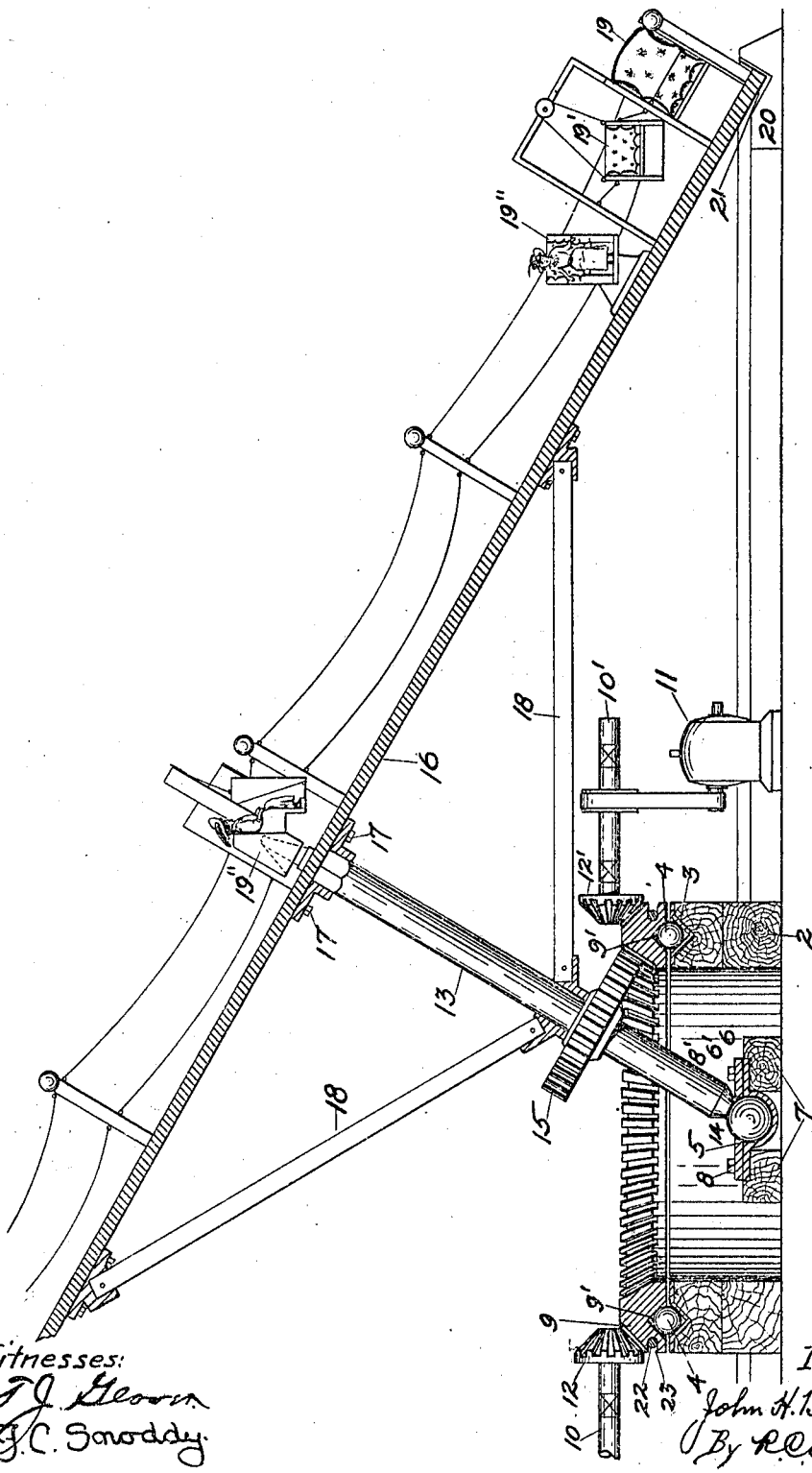

UNITED STATES PATENT OFFICE.

JOHN H. BRAMKAMP, OF ESTACADA, OREGON.

ROUNDABOUT.

953,119. Specification of Letters Patent. Patented Mar. 29, 1910.

Application filed March 6, 1909. Serial No. 481,660.

*To all whom it may concern:*

Be it known that I, JOHN H. BRAMKAMP, a citizen of the United States, residing at Estacada, in the county of Clackamas and State of Oregon, have invented a new and useful Improvement in Roundabouts, of which the following is a specification, reference being had to the accompanying drawings.

My invention relates to roundabouts or moving amusement apparatus having swings or seats.

The object of my invention is to provide an amusement apparatus operated by suitable motive power and wherein a table carrying swings or seats is rotated with its surface in an inclined plane. I attain these objects as well as other distinct advantages by the mechanism, construction and arrangement of parts illustrated in the accompanying drawings, which form a part hereof.

The figure is a sectional elevation of my roundabout with accessory apparatus and mountings.

A foundation pit 2 constructed of strong and suitable material such as large timbers is provided, the same being firmly lodged upon the earth. On the top of the pit is a circular groove 3 in which a suitable number of balls 4 are placed. In the center of the pit is a socket 5 composed of a lower plate 6 with a concave recess in its upper surface and an upper retaining plate 6'. The socket is fixedly secured to foundation timbers 7 by bolts 8—8'.

A circular gear 9 with a groove 9' in its lower surface is rotatably mounted upon the balls 4. The gear 9 is beveled upon its inner and outer surfaces each of which is formed with teeth thereon. Rotatable shafts 10—10' are arranged in suitable position to transmit power to the gear 9 from power sources, such as a motor 11. The shafts 10—10' have beveled gears 12—12' formed and placed to engage the teeth on the outer surface of the gear 9. Instead of this manner of transmitting power, it may also be applied by means of a cable 22 connected with a power source and extending around the gear 9 in a grove 23 in the outer surface of the same.

The lower end of a large shaft 13 having a ball 14 integral therewith is mounted in the socket 5. At a suitable height on the shaft 13 and at right angles thereto a spur gear 15 is rigidly secured and also in position that its teeth shall engage the teeth on the inner beveled surface of the gear 9 at a proper angle thereto and in a manner to retain the shaft 13 in an inclined position. A swing-carrying circular table 16 is rigidly secured at the center of its lower surface to the upper end of the shaft 13 by bolts 17. The table is also firmly braced and made rigid at right angles to the shaft by means of a suitable number of lateral brace bars 18 secured at their lower ends to the shaft 13 and secured at their upper ends to the lower surface of the table 16 at a convenient angle thereto. Upon the upper surface of the table are arranged swings and seats 19, 19' and 19'' of various kinds either fixed or movable and with means to retain the movable seats or swings in horizontal position while the table is being rotated. At a suitable distance from the center of the pit 2 and about the pit a circular groove 20 is secured to the ground. The inner surface 21 of the groove 20 is formed at an angle which allows the lower surface and outer edge of the rim of the table 16 to engage it and rotate in the groove while revolving upon its axis, the shaft 13.

It will now be seen that when the power is applied to the horizontal shafts 10—10' they cause the circular gear 9 to rotate upon its ball bearings and it in turn through the spur gear 15 rotates the shaft 13 in its ball and socket bearing. The shaft 13 in so rotating revolves the swing carrying table 16 in its outer bearings the groove 20. In this manner the seats or swings are carried entirely about in a circular path and are also given a gyratory rising and falling movement. Thus it will be seen that when in use I can impart a continuous rotation to my roundabout, in the manner described. It is also easy for persons to pass upon the table and into the seats upon its part which at the moment is engaging the outer groove, as the table is slowly revolved, until all are seated when its speed may be increased. The rim of the table being entirely clear of mechanism and fitting closely in the outer groove there is no danger in stepping from the ground upon the table and into its seats or swings. It is also apparent that the swing table rolling about in the groove 20 is relieved of great tension upon its mechanism as well as lost motion which would all occur if the table were carried in the air upon its supporting shaft only. This feature also eliminates much mechanism and supporting parts otherwise necessary for an inclined table and adds greatly to the safety and easy operation of the device I illustrate.

Having thus fully described my invention, I claim:

1. A roundabout of the kind described, comprising a pit having a circular groove on its top, balls in said groove, a rotatable grooved circular pit gear 9 mounted on said balls and having beveled and toothed inner and outer surfaces, a center shaft 13 provided with a ball and socket joint at its lower end in the center of said pit, a spur gear 15 rigidly secured on the shaft 13 at right angles thereto and of a diameter and location on the shaft to engage the gear 9 and retain the shaft in a suitably inclined position, a circular table 16 rigidly secured at the center of its lower surface to the upper end of the shaft 13 at right angles thereto, means to brace said table on the shaft above the gear 15, rigid seats 19 and swinging seats 19′ and 19″ secured only upon the upper surface of the table 16, a circular groove about the pit so formed and located that it will receive the lower side of the rim of the table 16 and allow it to move therein in rotating engagement, and means to transmit power to the gear 9, substantially as described.

2. In a roundabout of the kind described, the combination of a circular table 16 having rigid seats 19 and swinging seats 19′ and 19″ secured only on its upper surface, with a shaft 13 provided with a ball and socket joint at its lower end, a spur gear 15 rigidly secured on the shaft 13 at right angles thereto and of a diameter and location on the shaft to engage power transmitting mechanism and retain said shaft in a suitably inclined position, and means to secure the upper end of said shaft to the table and to brace the table on the shaft above said gear 15, substantially as described.

3. In a roundabout of the kind described, the combination of a circular table 16 having rigid seats 19 and swinging seats 19′, 19″ secured only on its upper surface, a shaft 13 provided with a ball and socket joint at its lower end, a spur gear 15 rigidly secured on the shaft 13 at right angles thereto and means to secure the table on the upper end of said shaft and to brace it above said gear, all with a pit having a circular groove on its top, balls in said groove, a rotatable grooved circular pit gear 9 mounted on said balls and having beveled, toothed inner and outer surfaces so formed, one to engage said spur gear 15 and retain the shaft 13 in a suitably inclined position, the other to engage power transmitting mechanism, substantially as described.

4. In a roundabout of the kind described, the combination of the mechanism of an inclined, circular table, carrying swings on its upper surface only and having a ball and socket mounted shaft, with an outer groove formed and located to receive the lower side of the rim of said swing carrying table therein and in rotating engagement therewith, substantially as described.

JOHN H. BRAMKAMP.

Witnesses:
J. W. REED,
L. C. POSSON.